United States Patent [19]
Sieren

[11] 3,709,344
[45] Jan. 9, 1973

[54] CLUTCH AND BRAKE PEDAL WITH NEUTRAL SAFETY SWITCH

[75] Inventor: Gerald E. Sieren, Greendale, Wis.

[73] Assignee: Allis-Chalmers Corporation, Milwaukee, Wis.

[22] Filed: Dec. 13, 1971

[21] Appl. No.: 207,204

[52] U.S. Cl. ..................192/.094, 74/846, 192/.09, 192/3 R, 192/3.61, 192/4 A, 192/13 R, 192/114
[51] Int. Cl. ..................................B60k 29/00
[58] Field of Search ........192/.046, .094, .09; 74/846

[56] References Cited

UNITED STATES PATENTS

| | | | |
|---|---|---|---|
| 2,123,349 | 7/1938 | Wright | 192/.094 |
| 2,208,364 | 7/1940 | Fusella | 192/.09 |
| 3,400,790 | 9/1968 | Ruhl et al. | 192/.094 |
| 3,419,115 | 12/1968 | Glenn | 192/.084 |

Primary Examiner—Benjamin W. Wyche
Attorney—Arthur L. Nelson et al.

[57] ABSTRACT

A vehicle clutch and brake control having a single dependent pedal pivotally supported to sequentially disengage a clutch and engage a brake while simultaneously operating a starter safety switch and having means to a substantially increase pedal force when said pedal moves into the brake engagement phase of rotation.

10 Claims, 9 Drawing Figures

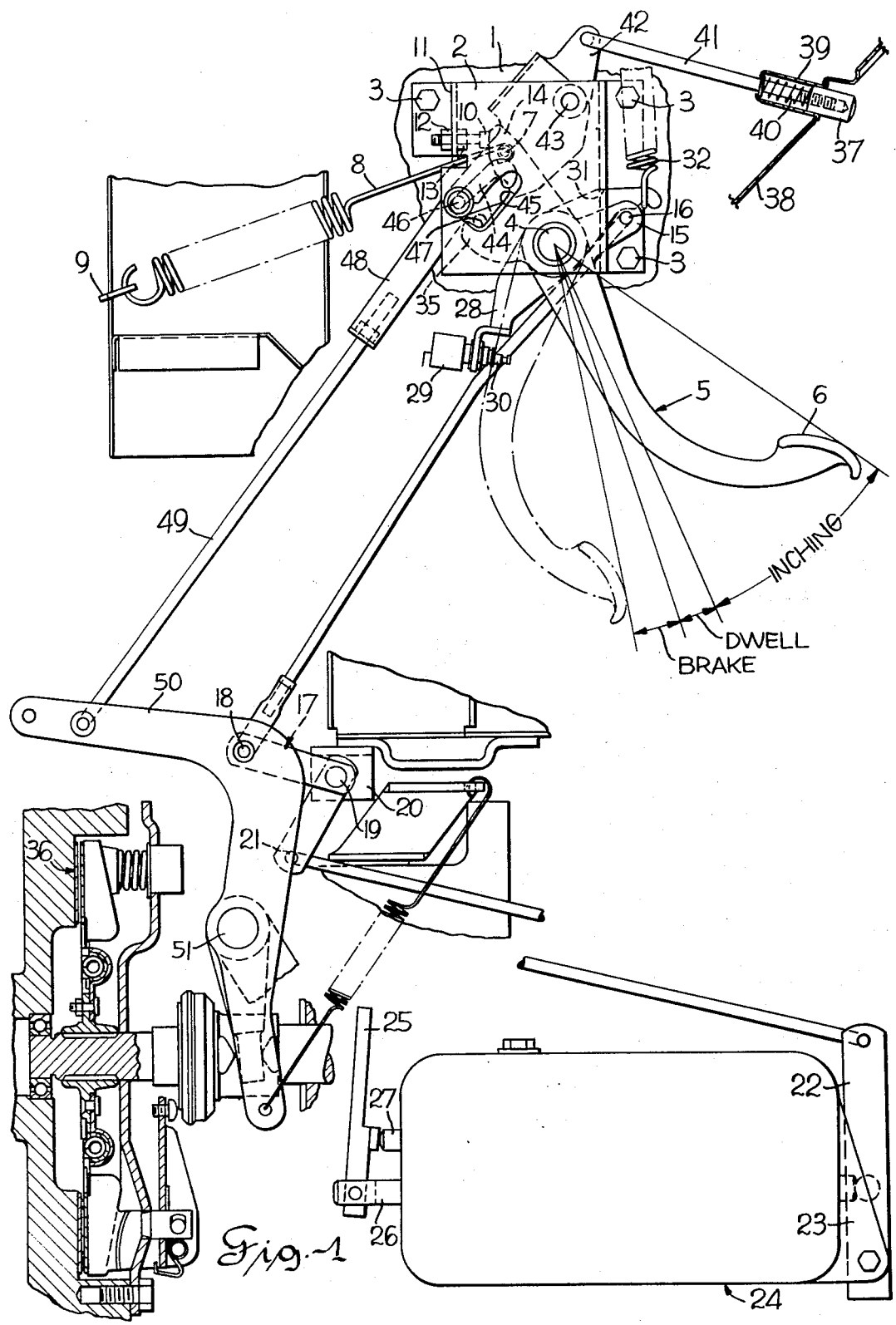

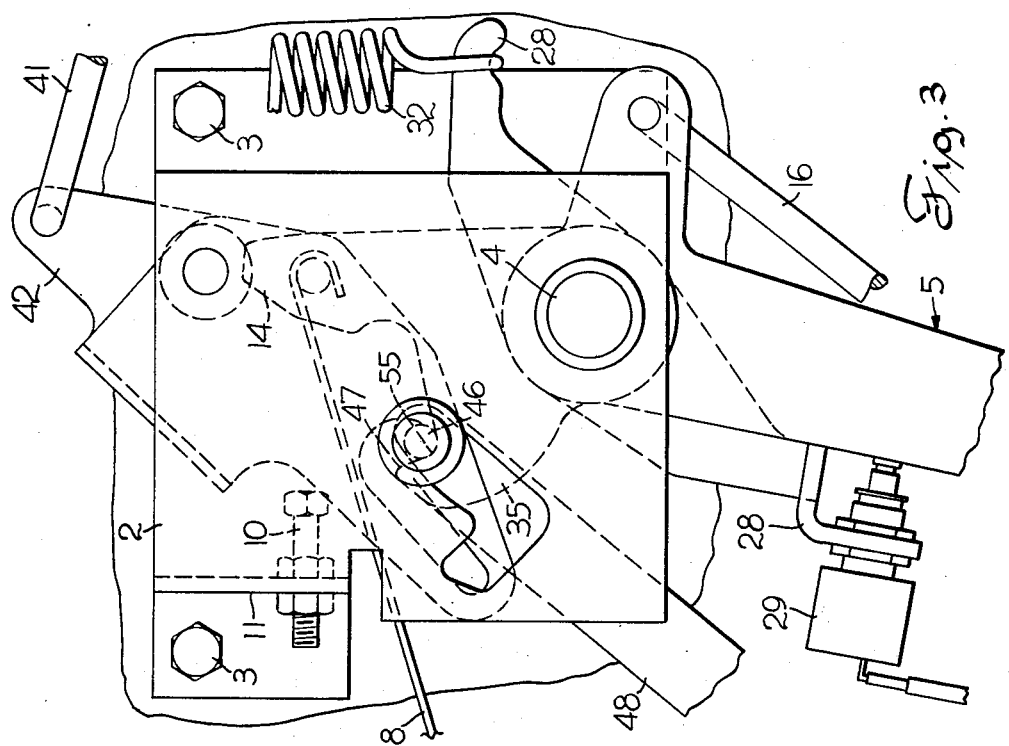
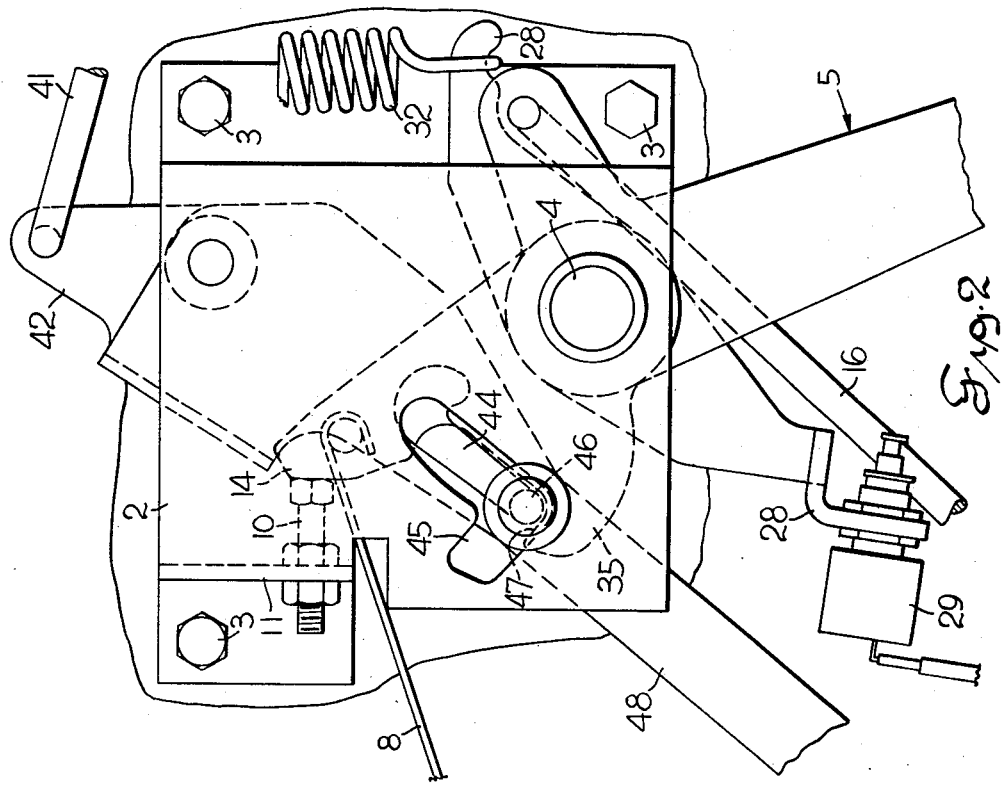

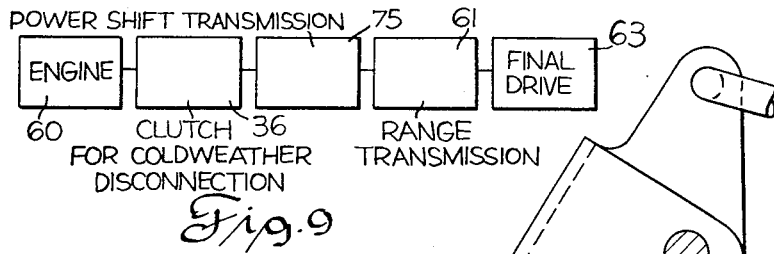
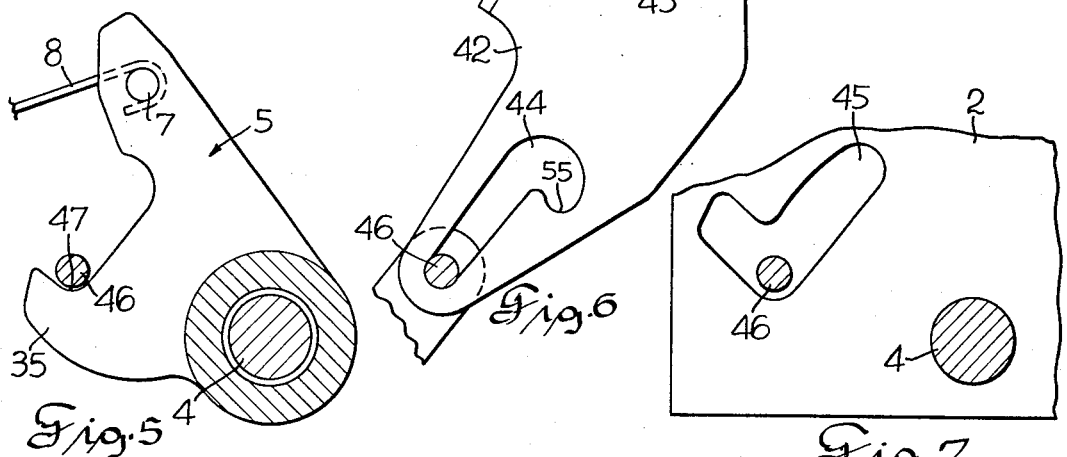
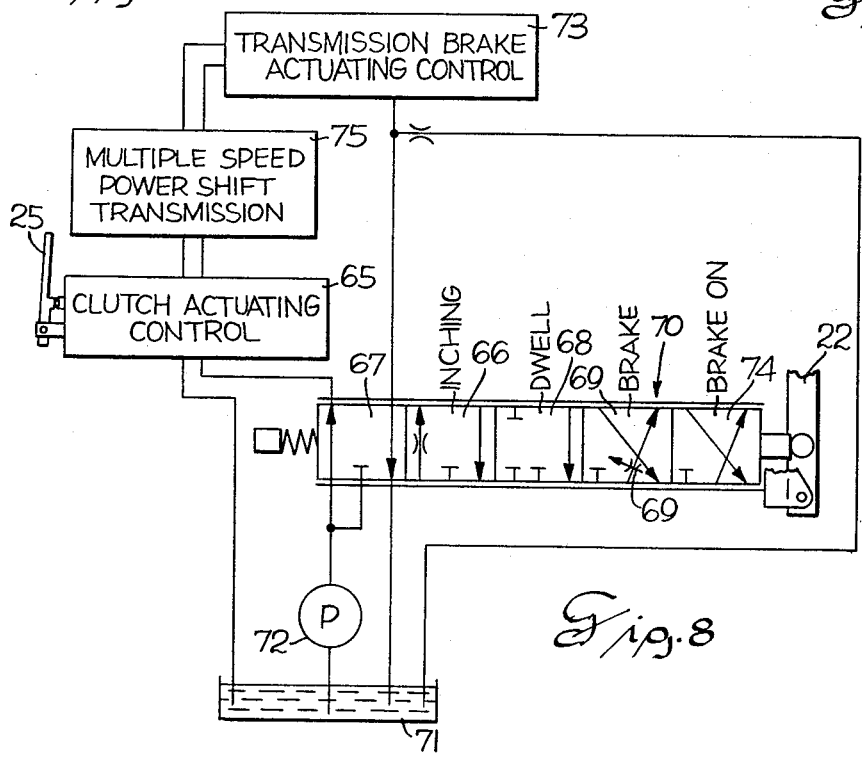

CLUTCH AND BRAKE PEDAL WITH NEUTRAL SAFETY SWITCH

This invention relates to a clutch and brake control and more particularly to a clutch and brake lever which sequentially operates to disengage a vehicle clutch and engage a vehicle transmission brake while operating a neutral safety switch and providing increased brake pedal force during the brake operation.

The conventional vehicle having an engine driving through a clutch and a standard manual shift transmission drives through the final drive assembly to drive the rear wheels of the vehicle. Ordinarily the clutch is manually operated to permit shifting of the gears from one speed ratio to another. With a syncromesh transmission the gears may be shifted while the vehicle is moving providing there is little or no draft load on the vehicle. However, shifting from one speed to another while moving has its limitations since a heavy draft load will quickly slow down the vehicle thereby making shifting while on the move almost impossible. Hydraulically operated clutches and transmission more commonly known as a power director permit shifting between a low and high range while the tractor is on the move. The shift is made quickly and the modulation of the pressurized fluid actuating the clutches for shifting from one range to the other overcomes shock loading as the clutches transfer the power through one power path to another.

A more sophisticated arrangement of a power train is the power shift transmission. This type of a transmission permits shifting from one gear ratio to another through hydraulic actuators which can be shifted while the vehicle is moving and also while the vehicle is carrying a heavy draft load. This type of a power train provides greater versatility than the previously described power trains and is becoming more commonly used in modern heavy duty tractors.

An added refinement to this type of a power train includes a clutch which is usually a manual clutch behind the engine which can be disengaged to uncouple the engine from the power shift transmission. This clutch is not used very often but it is usually used when starting the engine if the ambient temperatures are quite low. Under these circumstances the viscosity of the hydraulic fluid and lubricants produce considerable drag which is difficult to overcome particularly if the engine does not start immediately.

This clutch is generally engaged and the power from the engine is transmitted directly to a multiple speed power shift transmission. Behind the power shift transmission a range transmission may be positioned which multiplies the overall speed range of the power shift transmission. In other words, the power shift transmission having five speeds connected through a range transmission having two speeds will provide a vehicle with 10 speeds for the power train. The range transmission of course, drives through the final drive assembly which drives the rear wheels of the vehicle.

Associated with this type of a power train, the range transmission is usually shifted when the vehicle is stationary and when the components of the power shift transmission are stationary. Accordingly, this invention provides a control linkage which will provide clutching of the power shift transmission and a transmission brake for braking the rotating components of the power shift transmission. The control linkage will disengage the power shift transmission to permit starting of the vehicle under ordinary temperatures. A latching arrangement may also be used with the control linkage in which the manual clutch between the engine and the power shift transmission can be disengaged to allow the engine to run more freely during starting.

For the purpose of shifting the range transmission it is advisable to disengage the clutches of the power shift transmission and to apply the transmission brake to the power shift transmission and thereby stop the rotating components of the power shift transmission and permit the manual shifting of the range transmission. This invention provides such a device in which the initial portion of the pivotal movement of the brake and clutch pedal permits controlled engagement of the power shift transmission. Further pivotal movement by depressing the clutch and brake pedal will completely disengage the clutches of the power shift transmission. Continued pivotal movement of the clutch and brake pedal will actuate the transmission brake.

Simultaneously with actuating the brake, a neutral safety switch is engaged which will close the neutral safety switch and permit starting through an electrical system. When the neutral safety switch is closed, the switch lever which is normally returned to its retracted position by a heavy spring will then produce a heavy force on the pedal indicating to the operator of the vehicle that the neutral safety switch is closed and the transmission brake is applied. Accordingly, the range transmission can be manually shifted without any danger of damage to gears in the range transmission.

It is an object of this invention to provide a clutch and brake pedal with means for operating the neutral safety switch and producing a brake pressure feel when the pedal is pivoting through the braking phase.

It is another object of this invention to provide a clutch and brake pedal and a switch lever pivotally supported in a manner whereby the neutral safety switch is operated by the pedal and a switch lever return spring increases the force required to further depress the brake pedal while operating the transmission brake.

It is a further object of this invention to provide means for pivotally supporting a depending clutch and brake actuating foot pedal with a pivotal switch lever mounted on the same axis of rotation and having a return spring. The clutch and brake pedal operates the neutral safety switch while the return spring on the switch lever increases the pedal force while operating the pedal through the brake actuating phase of rotation to thereby indicate to the operator the position of the pedal to permit shifting of the range switch.

Objects of this invention are accomplished providing a pivotally operated foot pedal which normally operates for disengagement of the clutch and engagement of the brake upon depression of the pedal. A switch lever carrying a neutral safety switch is pivotally mounted on the same axis. A heavy return spring returns the switch lever to its normally retracted position. When the pedal is pivoted it engages the neutral safety switch as it enters the brake operating phase of pivotal movement and as it pivots the switch lever an increased force is required on the pedal due to the tension on the switch lever return spring to provide a brake "feel" to the operator.

The preferred embodiments of this invention will be illustrated in the attached drawings.

FIG. 1 illustrates the side elevation view of the pedal and control for operating the clutch and brake.

FIG. 2 is a fragmentary side elevation view showing the control lever with the latch control in position for the disengagement of two clutches.

FIG. 3 illustrates the latch control positioned with the foot pedal operating two clutches simultaneously.

FIG. 5 is a fragmentary view showing a portion of the foot pedal engaging a pin for actuating the second clutch taken on line V—V of FIG. 4.

FIG. 6 illustrates the latch arrangement and its connection with the linkage for actuating the second clutch to provide cold weather disconnecting of the engine taken on line VI—VI of FIG. 4.

FIG. 7 illustrates a fragmentary view of the mounting bracket and a pin for controlling the disengagement of the second clutch or disengaging the engine from the power train taken on line VII—VII of FIG. 4.

FIG. 8 is a schematic illustration of the hydraulic control valve operated by the linkage to operate the transmission clutch and brake.

FIG. 9 is a schematic illustration of the power train of the vehicle.

Figure 4:
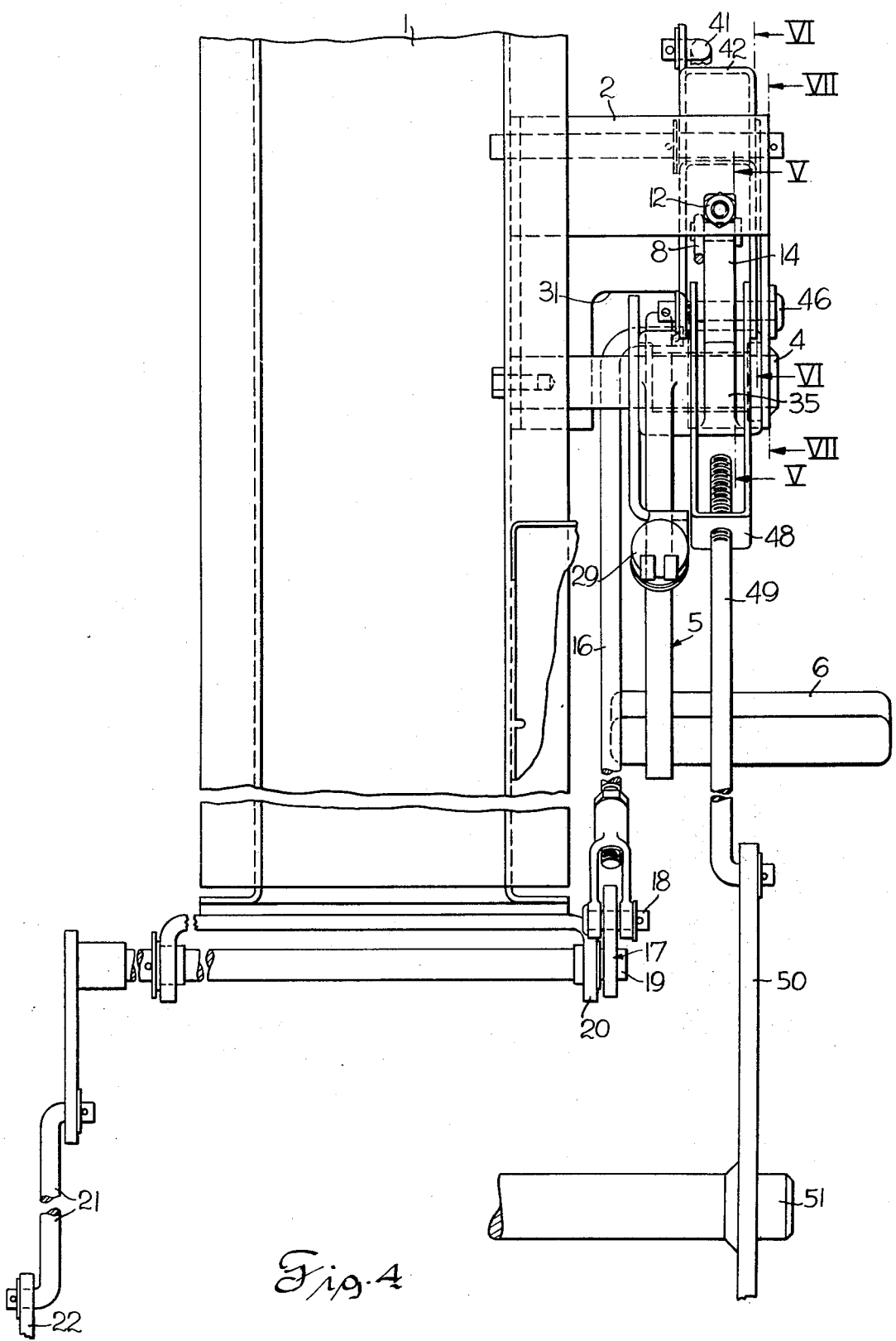
FIG. 4 illustrates an end view generally of the mechanism shown in FIG. 1.

Referring to FIG. 1 the mounting bracket 2 is fastened on the chassis 1 by means of the plurality of bolts 3. The mounting bracket carries a pin 4 which pivotally supports the foot pedal 5. The foot pedal 5 forms a foot pad 6 for operating foot pedal 5 and carries a return pin 7 connected to the return spring 8, which in turn has connected to a tab 9 on the chassis 1. The adjusting screw 10 threadedly engages a flange 11 and is locked in position by the nuts 12 and 13. When the pedal 5 is returned to its retracted position it comes to a rest as the abutment 14 engages the end of the adjusting screw 10.

The foot pedal 5 is formed with an arm 15 having a perforation receiving the rod 16. The rod 16 extends downwardly and is pivotally connected to the bell crank 17 by the pin 18. The bell crank 17 is pivotally supported by the pin 19 on the bracket 20 supported on the chassis. The opposite end of the bell crank 17 carries the link 21 which extends to engage the lever 22 pivotally supported on the flange 23, on the valve housing 24. The power shift control lever 25 is pivotally supported on the extension 26 which operates the spool 27, in the valve housing 24. The lever 25 provides a manual shift for the power shift transmission to selectively engage the desired speed ratio of the power shift transmission.

The brake and clutch pedal 5 is pivotally mounted on the pin 4 which also pivotally supports a switch lever 28. The switch lever 28 carries the neutral safety switch 29 which is normally open but is closed by actuation of the button 30 by the pedal 5.

The switch lever 28 is biased to the return position against the rest 31 by the return spring 32 which is connected between the chassis and one arm of the switch lever.

The pedal 5 travels through an angular displacement when it is operated in which the first portion is considered inching as illustrated in FIG. 1. During the inching phase of angular rotation the hydraulic valve is throttling pressurized fluid and the pressure in the clutch actuator is gradually decreased. The gradual decrease of the pressure in the clutch actuator permits the slipping of the clutch to move the vehicle very slowly. This adapts itself well when connecting an implement to a tractor because a sensitive control of the movement of the vehicle is required. As the pedal swings farther there is a dwell phase during which the clutch is completely disengaged prior to engagement of the brake. Beyond this point the neutral safety switch is operated to close the starter circuit to permit starting of the vehicle engine. When the neutral safety switch is closed the switch arm rotates on its axis against the biasing force of a return spring 32. Spring 32 substantially increases the force required to further depress the pedal 5. This provides a brake feel for the operator which indicates to the operator that the transmission brake is being operated. This indicates to the operator the neutral safety switch has been closed and that the brake is being actuated.

The pedal 5 also forms a latch arm 35 which is adapted for operating the engine clutch 36. The engine clutch 36 provides a means of disconnecting the power from the transmission. This is particularly advantageous when the ambient temperatures are low and the transmission fluids create considerable drag on the transmission. During starting of the engine, this drag can be objectionable.

Accordingly, the means for disconnecting the engine drive is provided. This consists essentially of a push button 37 mounted on the dash board 38. The push button slides within the sleeve 39 mounted on the dash board 38 and is biased to a return position by the spring 40. The link 41 connects to the latching arm 42. The latching arm 42 is pivotally supported on the bracket 2 by means of the pin 43. The latching lever 42 forms slot 44. Similarly an L-shaped slot 45 is formed in the bracket 2. These two slots partially overlap as shown in FIG. 1. The degree of overlapping may be modified by movement of the latching lever 42. Moving the latching lever 42 by the push button 37 moves the pin 46 into the seat 47 of the latch arm 35 of pedal 5. When the pedal is operated, the pin 46 rotates with the latch arm 35 to disengage the clutch 36.

The clevis 48 which receives the pin 46 on one end is connected through the rod 49 to the bell crank 50. Bell crank 50 is pivoted on the pin 51 supported on the chassis. As the bell crank 50 is rotated about the pin 51 in the clockwise direction the clutch 36 is disengaged and conversely the reverse rotation of the bell crank will engage the clutch 36. To more clearly illustrate the component shown in the pedal mechanism and the latching mechanism, FIGS. 5, 6 and 7 show section views of the various components. FIG. 5 illustrates the portion of the pedal 5 with the return spring 8 connected through the pin 7. The latching arm 35 is shown with the pin 46 positioned in its seat 47 of the latch arm 35 for rotation with the foot pedal 5 when operating the clutch 36.

FIG. 6 shows latching lever 42 with the pin 46 in the extreme end of the slot 44. Generally this position is also shown in FIG. 1.

FIG. 7 illustrates the pin 4 which supports the pedal 5 on the bracket 2. The slot 45 is shown with the pin 46 displaced for engagement with the latch arm 35 of the pedal 5. The pedal 5 is shown in FIG. 5 with the positioning of the pin for engagement with latch arm 35.

FIG. 2 illustrates a fragmentary view of the mechanism shown in FIG. 1 with the latching lever 42 which is operated by the push button 37 to a position seating the latch pin 46 on the latch arm 35 on the pedal 5. In this position the slot 44 overlaps slot 45 and the pin 46 is permitted to rotate with the latch arm 35 as the pedal 5 is depressed. By holding the latching lever 42 in this position when the pedal 5 is depressed the pin rotates on the center of the pin 4 to a position as shown in FIG. 3. If the pedal is rotated to its extreme position as shown in FIG. 3, the pin 46 will become seated in the notch 55 of slot 44. If the pedal 5 is released at this point the pin 46 will be retained in the notch 55 and the clutch 36 will remain disengaged. In this position the engine can be started.

To release the pin 46 and disengage the clutch 36, the pedal must again be depressed and the latching lever 42 rotated counterclockwise to release the pin 46. The springs in clutch 36 return pin 46 and release the clutch 36 when the pedal is released.

For the purpose of illustration, the power train is illustrated in FIG. 9. The engine 60 drives through the clutch 36 which provides a means of disconnecting the power from the power shift transmissions 75 when desired. This clutch is also shown as clutch 36 in FIG. 1. The power shift transmission 75 drives through the range shift transmission 61 which in turn drives through the final drive 63 to drive the rear wheels of vehicle. The range shift transmission consists essentially of a multiple speed transmission which should normally be shifted only when the transmission components are stationary. Accordingly, the transmission brake which is operated by the pedal 5 as shown in FIG. 1 brakes the power shift transmission 75. This stops rotation of the components in the range transmission and the transmission can be shifted manually from one speed to another speed.

FIG. 8 also illustrates a multiple speed power shift transmission 75 schematically with brake and clutch actuating controls 65 and 73 which selectively actuates one or more clutches or brakes in the transmission to provide the desired speed ratio through the power shift transmission. It is understood that normally the brake and clutch actuating controls 65 and 73 will operate the power shift transmission 75 in shifting from one gear ratio to another.

Preferably a lower speed range would be selected on the power shift transmission when operating the inching control of brake pedal 5. Section 67 shows the valve 70 position for normal operation of the clutches at the power shift transmission. The brake is vented to sump 71 while the pump 72 supplies pressurized fluid to actuate the multiple speed power shift transmission 75.

Initially the inching would be provided by section 66 of the valve 70. Section 66 would vent the brake actuating control for the transmission to sump 71.

The dwell position of section 68 is shown in which the clutch is disengaged and also the brake is disengaged.

Clutches for operating the multiple speed power shift transmission 75 are disengaged and fluid is throttled to begin actuation of the transmission brake actuating control 73 as shown by section 69. With the brake fully actuated the section 74 is positioned to transmit fluid from the clutches to sump and the transmission brake 73 is fully engaged. In this position the components of the power shift transmission 75 are braked and this provides a condition whereby the range transmission 61 can be shifted from one speed to another.

The operation of the transmission will be described in the following paragraphs.

FIG. 9 generally illustrates the power train for the vehicle. The engine 60 drives through a manually operated clutch 36 to the power shift transmission 75. The manual transmission 36 is always in engagement when the vehicle is in operation. The power shift transmission 75 has means for shifting the transmission from one gear range to the other as desired for operation of the vehicle. The power shift transmission 75 drives through a range transmission 61 which consists of, for the purpose of illustration, a two speed transmission which is shifted when the vehicle and transmission are stationary. In this position the range transmission can be shifted from one gear range to another which will provide a simple multiple of the gear ratios of the power shift transmission 75 when transmitted to the final drive 63.

Under cold weather conditions the viscosity of the oil and the internal friction of the engine require that the power shift transmission be disconnected from the engine in order to start the engine. Accordingly, the clutch 36 is disengaged to permit the engine to rotate more freely. This device is shown for disconnecting clutch 36 as shown in FIG. 1.

When the vehicle is in operation the control lever 25 provides a means for shifting the selected clutches of the power shift transmission to engage the desired gear ratios in the transmission. The shifting of the power shift transmission through the control lever 25 is accomplished while the vehicle is in operation and the gear ratios may be increased or decreased as desired.

The clutch 36, however, is a manual clutch and is connected between the engine and the multiple speed power shift transmission 75. The clutch 36 can be disengaged through the foot pedal 5 when desired. Also the control of the foot pedal 5 provides an inching of any clutch in the power shift transmission through clutch actuating control 65. The particular clutch engaged in the power shift transmission by clutch actuating control 65 is dependent on the position of the lever 25. The inching control is used primarily when it is desired to move the vehicle slowly for connection to an implement or for slipping the clutch to provide a slow gradual movement. As the brake pedal 5 is depressed, the initial section 67 provides operation of the multiple speed power shift transmission. As the lever 22 is operated in response to the pivotal movement of the pedal 5, the inching section 66 of the control valve 70 is moved into operation between the pump 72 and the clutch actuating control 65. This provides throttling through the inching section limiting the flow of pressurized fluid to the clutch actuating control 65 which in turn operates hydraulic actuators in the multiple speed power shift transmission 75. The farther the pedal 5 is depressed, the greater the pressure is reduced in the clutch actuating control 65. With a continual depression of the pedal 5 the dwell section 68 is then placed in operation between the pump 72 and the clutch actuating control 65. In this position the clutch in the multiple speed power shift transmission 75 is disengaged. Due to inertia, the components in the power shift transmission continue to rotate and accordingly the pedal 5 is depressed until the brake section 74 is in operation. When the brake section 74 is positioned intermediate to pump 72 and the transmission brake actuating control 73, the transmission brake stops rotation of the rotating components in the multiple speed power shift transmission. Accordingly, the power train between the engine and the final drive assembly is disconnected and the range shift 61 may be shifted.

Simultaneously with the disengagement of a clutch in the multiple speed power shift transmission 75 it may be desirable to disengage clutch 36. To disconnect clutch 36, prior to the depression to the pedal 5, the push button 37 is moved forwardly. This operates the latching lever 42 to the position shown in FIG. 2 wherein the slots 44 and 45 overlap and thereby positioning the pin 46 in the seat 47 of the latch arm 35 of pedal 5. With the pin in this position when the pedal 5 is depressed, the pin will be carried by the seat 47 as the lever is pivoted. A continual depression of the pedal 5 will rotate the pin 46 to the position as shown in FIG. 3. In this position when the pedal 5 is released, the pin 46 remains seated in the notch 55. With the pin in notch 55 the clutch 36 remains disengaged.

It is noted that when the pin 46 is carried on the latch arm 35, that the bell crank 50 rotates about its axis defined by pin 51 thereby disengaging clutch 36. The clutch 36 may be retained in this disengaged position as the vehicle is started. It is assumed that the vehicle is started through an electrical starting circuit.

When the pedal 5 is depressed it swings through the inching and dwell phase of angular displacement as shown in FIG. 1. When the pedal 5 engages the neutral safety switch 29, the neutral safety switch is then closed permitting the electrical starting circuit to operate since the clutch is disengaged and there is no danger of the vehicle lurching forward when the vehicle engine is started. A further depression of the pedal 5 pivots the switch lever 28. The pivoting of the switch lever 28 tensions the return spring 32 which produces a substantial force on the pedal indicating to the operator that the pedal 5 is swinging into the braking phase of its operation. The neutral safety switch 29 being positioned on the lever 28 permits the continued movement of the lever 5 to operate the brake and yet maintain the neutral safety switch in closed position. The neutral safety switch 29 on switch lever 28 will return in response to the biasing force of the spring 32 when the brake pedal 5 is released the return spring 8 connected to the brake pedal 5 will return the brake pedal to its normally retracting position causing the abutment on the arm 14 to engage the head of the adjusting screw 10.

The spring 32 serves the dual purpose of returning the switch lever 28 to retractive position when the pedal 5 is retracted and also providing a brake "feel." In other words, the operator of the vehicle can sense the braking phase of pedal rotation during operation of the pedal 5. This indicates that the neutral safety switch 29 is closed and that the brake pedal is engaging the transmission brake so that he may then shift the range transmission 61 without damage to the gears. By mounting the neutral safety switch on the switch lever 28, the pedal 5 does not come to an abrupt stop when the switch is engaged but is permitted to rotate with the lever for the desired amount of rotation to set the brakes.

It is also noted that when operating pedal 5 and the brake that the engine clutch 36 is also disengaged and can be positioned to be retained in the disengaged position through the latch engaging lever 42 and as previously described.

The embodiments of the invention in which an exclusive property or privilege is claimed are defined as follows:

1. A vehicle clutch and brake actuating means comprising, a clutch and brake pedal pivotally mounted on a vehicle for pivotal movement through a clutch operating phase and a brake operating phase, at least one clutch for controlling the operation of a transmission including means for engaging and disengaging the clutch, a brake for braking the transmission including means for engaging and disengaging the brake, means connecting said pedal with said clutch and brake engaging and disengaging means to sequentially disengage said clutch and engage said brake, means supporting a starter safety switch for engagement with said clutch and brake pedal as said pedal initially swings through the brake operating phase of pivotal movement, means resiliently mounted for engaging said pedal to increase the reaction force on said pedal as said pedal swings through the brake operating phase to thereby indicate to the operator the brake operating phase of pedal movement.

2. A vehicle clutch and brake actuating means as set forth in claim 1 including a return spring connected to said brake pedal for returning said pedal to a normally retracted position, a lever pivotally supported for pivotal movement on an axis coincidental with the axis of rotation of said clutch and brake pedal, a return spring connected to said lever for returning said lever to a normally retractive position, a return stop defining the retracted position of said lever, said lever engages said pedal only during the brake operating phase to provide increased reaction force on said pedal.

3. A vehicle clutch and brake actuating means as set forth in claim 1 including means defining a pivotal axis for said clutch and brake pedal, a switch lever pivotally mounted on an axis coincidental with the clutch and brake pedal axis, a return spring connected to said switch lever to normally retract switch lever to a normally retractive position, means mounting said starter safety switch on said switch lever to engage said pedal as it swings through its brake operating phase.

4. A vehicle clutch and brake actuating means as set forth in claim 1 including means defining a pivotal axis for said clutch and brake pedal, a return spring connected to said pedal to return it to its normally retractive position, a lever pivotally supported on an axis coincidental with the axis of said brake pedal, a return spring connected to said lever to return said lever to its normally retracted position for engagement with said pedal as said pedal swings into the brake operating phase of its pivotal movement.

5. A vehicle clutch and brake actuating means as set forth in claim 1 including means providing the pivotal axis for said clutch and brake pedal, a switch lever pivotally mounted on an axis coincidental with the pivotal axis of said pedal, a return spring connected to said switch lever to return it to a normally retracted position, means supporting said neutral safety switch on said switch lever for engaging said pedal when said pedal swings through its pivotal path initiating the brake operating phase.

6. A vehicle clutch and brake actuating means as set forth in claim 1 including a support bracket, means defining a pivotal axis supporting said pedal on said support bracket, a switch lever pivoting about an axis coincidental with the pivotal axis of said lever, a return spring connected to said pedal for retracting said pedal to its normally retracting position, a return spring connected to said switch lever for returning said lever to its normally retracted position, a rest stop engaging said switch lever defining its normally retracted position, means supporting said starter switch on said switch lever for engaging said pedal during initial pivotal movement through the brake operating phase.

7. A vehicle clutch and brake actuating means as set forth in claim 1 including a support bracket pivotally supporting said pedal and defining a pivotal axis for said pedal, an adjustable pedal return stop on said bracket, a return spring connected to said pedal for returning said pedal to engage said return stop to define the beginning of the clutch operating phase, a switch lever pivotally mounted on said bracket, means supporting said starter safety switch on said switch lever, a lever stop on said bracket, a spring normally retracting said switch lever to engage said lever stop and define the beginning of the brake operating phase and thereby engage said starter safety switch and increase the reaction force on said lever when operating said pedal.

8. A vehicle clutch and brake actuating means as set forth in claim 1 including a bracket, a switch lever, a pin pivotally supporting said pedal and said switch lever, a pedal rest stop engaging said pedal, a lever rest stop engaging said switch lever, resilient means returning said lever and said pedal to their normally retracted positions thereby engaging said rest stops and defining an initial clutch operating phase and a subsequent brake operating phase of the pedal pivotal movement.

9. A vehicle clutch and brake actuating means as set forth in claim 1 wherein said pedal defines a foot pedal, a bracket pivotally supporting said foot pedal, an adjustable rest stop for engaging said pedal in its normally retractive position thereby defining the initial clutch operating phase of the pedal pivotal movement.

10. A vehicle clutch and brake actuating means as set forth in claim 1 including a bracket mounted on the vehicle chassis, a pin supported on said bracket for pivotally supporting said pedal, a switch lever pivotally mounted for pivotal movement on said pin, a starter safety switch mounted on said switch lever, a rest stop on said bracket for engaging said switch lever in its normally retractive position, a return spring for normally retracting said pedal in its normally retractive position, a second spring for returning said switch to its normally retractive position to provide increased reaction for said pedal when said pedal is pivoted through the brake operating phase.

* * * * *